(12) United States Patent
Maat et al.

(10) Patent No.: US 8,385,025 B2
(45) Date of Patent: Feb. 26, 2013

(54) CURRENT-PERPENDICULAR-TO-THE-PLANE (CPP) MAGNETORESISTIVE (MR) SENSOR WITH IMPROVED SEED LAYER STRUCTURE FOR HARD BIAS LAYER

(75) Inventors: Stefan Maat, San Jose, CA (US); Alexander M. Zeltser, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 308 days.

(21) Appl. No.: 12/969,466

(22) Filed: Dec. 15, 2010

(65) Prior Publication Data

US 2012/0156522 A1 Jun. 21, 2012

(51) Int. Cl.
G11B 5/39 (2006.01)

(52) U.S. Cl. .................................. 360/324.12

(58) Field of Classification Search .......... 360/319, 360/324.1, 324.11, 324.12, 324.2
See application file for complete search history.

(56) References Cited

U.S. PATENT DOCUMENTS

| | | | |
|---|---|---|---|
| 6,385,017 B1 | 5/2002 | Min et al. | |
| 6,636,392 B2 | 10/2003 | Ito et al. | |
| 6,636,400 B2 * | 10/2003 | Pinarbasi et al. | 360/324.12 |
| 6,954,343 B2 | 10/2005 | Larson et al. | |
| 7,038,892 B2 | 5/2006 | Chau et al. | |
| 7,116,527 B1 | 10/2006 | Fukuzawa et al. | |
| 7,259,941 B2 | 8/2007 | Pinarbasi | |
| 7,342,752 B1 | 3/2008 | Zhang et al. | |
| 7,433,163 B2 | 10/2008 | Freitag et al. | |
| 7,446,987 B2 | 11/2008 | Zhang et al. | |
| 7,616,409 B2 * | 11/2009 | Freitag et al. | 360/324.11 |
| 7,848,065 B2 * | 12/2010 | Freitag et al. | 360/324.12 |
| 8,004,800 B2 * | 8/2011 | Freitag | 360/324.12 |
| 2005/0280959 A1 * | 12/2005 | Guo et al. | 360/324.12 |
| 2010/0330395 A1 * | 12/2010 | Zhang et al. | 428/813 |

FOREIGN PATENT DOCUMENTS

JP 2008097700 4/2008

* cited by examiner

Primary Examiner — Jefferson Evans

(74) Attorney, Agent, or Firm — Thomas R. Berthold

(57) ABSTRACT

A current-perpendicular-to-the-plane (CPP) magnetoresistive (MR) sensor has an improved seed layer structure for the ferromagnetic hard (high coercivity) bias layer that is used to longitudinally bias the sensor's free ferromagnetic layer. The seed layer structure is a trilayer consisting of a first seed layer of tantalum (Ta), a second seed layer of one or both titanium (Ti) and Ti-oxide on and in contact with the Ta layer, and a third seed layer of tungsten (W) on and in contact with the second seed layer.

19 Claims, 4 Drawing Sheets

CURRENT-PERPENDICULAR-TO-THE-PLANE (CPP) MAGNETORESISTIVE (MR) SENSOR WITH IMPROVED SEED LAYER STRUCTURE FOR HARD BIAS LAYER

BACKGROUND OF THE INVENTION

1. Field of the Invention

The invention relates generally to a current-perpendicular-to-the-plane (CPP) magnetoresistive (MR) sensor that operates with the sense current directed perpendicularly to the planes of the layers making up the sensor stack, and more particularly to a CPP MR sensor with an improved seed layer structure for the hard bias layer that longitudinally biases the sensor free layer.

2. Background of the Invention

One type of conventional magnetoresistive (MR) sensor used as the read head in magnetic recording disk drives is a "spin-valve" sensor based on the giant magnetoresistance (GMR) effect. A GMR spin-valve sensor has a stack of layers that includes two ferromagnetic layers separated by a nonmagnetic electrically conductive spacer layer, which is typically copper (Cu). One ferromagnetic layer adjacent the spacer layer has its magnetization direction fixed, such as by being pinned by exchange coupling with an adjacent antiferromagnetic layer, and is referred to as the reference layer. The other ferromagnetic layer adjacent the spacer layer has its magnetization direction free to rotate in the presence of an external magnetic field and is referred to as the free layer. With a sense current applied to the sensor, the rotation of the free-layer magnetization relative to the reference-layer magnetization due to the presence of an external magnetic field is detectable as a change in electrical resistance. If the sense current is directed perpendicularly through the planes of the layers in the sensor stack, the sensor is referred to as a current-perpendicular-to-the-plane (CPP) sensor.

In addition to CPP-GMR read heads, another type of CPP MR sensor is a magnetic tunnel junction sensor, also called a tunneling MR or TMR sensor, in which the nonmagnetic spacer layer is a very thin nonmagnetic tunnel barrier layer. In a CPP-TMR sensor the tunneling current perpendicularly through the layers depends on the relative orientation of the magnetizations in the two ferromagnetic layers. In a CPP-GMR read head the nonmagnetic spacer layer is formed of an electrically conductive material, typically a metal such as Cu. In a CPP-TMR read head the nonmagnetic spacer layer is formed of an electrically insulating material, such as $TiO_2$, MgO or $Al_2O_3$.

The sensor stack in a CPP MR read head is located between two shields of magnetically permeable material that shield the read head from recorded data bits on the disk that are neighboring the data bit being read. The sensor stack has an edge that faces the disk with a width referred to as the track width (TW). The sensor stack has a back edge recessed from the edge that faces the disk, with the dimension from the disk-facing edge to the back edge referred to as the stripe height (SH). The sensor stack is generally surrounded at the TW edges and back edge by insulating material.

A layer of hard or high-coercivity ferromagnetic material, typically a CoPt or CoPtCr alloy, is used as a "hard bias" layer to stabilize the magnetization of the free layer longitudinally via magneto-static coupling. The hard bias layer is deposited as an abutting junction onto insulating material on each side of the TW edges of the sensor. The hard bias layer is required to exhibit a generally in-plane magnetization direction with high coercivity ($H_c$) to provide a stable longitudinal bias that maintains a single domain state in the free layer so that the free layer will be stable against all reasonable perturbations while the sensor maintains relatively high signal sensitivity. The hard bias layer must have sufficient in-plane remanent magnetization ($M_r$), which may also be expressed as $M_r t$ since $M_r$ is dependent on the thickness (t) of the hard bias layer. $M_r t$ is the component that provides the longitudinal bias flux to the free layer and must be high enough to assure a single magnetic domain in the free layer but not so high as to prevent the magnetic field in the free layer from rotating under the influence of the magnetic fields from the recorded data bits. Moreover, a high squareness (S) hard bias material is desired, i.e., $S=M_r/M_s$ should approach 1.0, where $M_s$ is the saturation magnetization.

The desired magnetic properties of the CoPt or CoPtCr alloy hard bias layer are typically achieved by a seed layer or layers directly below the hard bias layer. Various types of seed layers, including CrMo, CrTi and TiW alloys, and bilayers, including NiTa/CrMo and CrMo/W bilayers, have been proposed in the prior art. In addition to achieving the desired magnetic properties for the subsequently grown CoPt or CoCrPt alloy, the seed layer should also be as thin as possible. This is because as the data density increases in magnetic recording disk drives, there is a requirement for a decrease in the read head dimensions, particularly the shield-to-shield spacing. However, because it is desirable to maintain the thickness of the hard bias layer to assure magnetic stabilization of the free layer, the thickness of the seed layer has to be reduced accordingly.

What is needed is a CPP MR sensor with an improved seed layer structure that can be made very thin yet still provide desirable magnetic properties for the hard bias layer.

SUMMARY OF THE INVENTION

The invention is a CPP MR sensor, like a CPP-GMR or CPP-TMR read head, with an improved seed layer structure for the hard bias layer. The seed layer structure is a trilayer consisting of a first seed layer of tantalum (Ta), a second seed layer of one or both titanium (Ti) and Ti-oxide on and in contact with the Ta layer, and a third seed layer of tungsten (W) on and in contact with the second seed layer. The trilayer is substantially thinner than prior art seed layer structures yet provides significant improvement in the magnetic properties of the hard bias layer.

For a fuller understanding of the nature and advantages of the present invention, reference should be made to the following detailed description taken together with the accompanying figures.

DETAILED DESCRIPTION OF THE INVENTION

Figure 1:
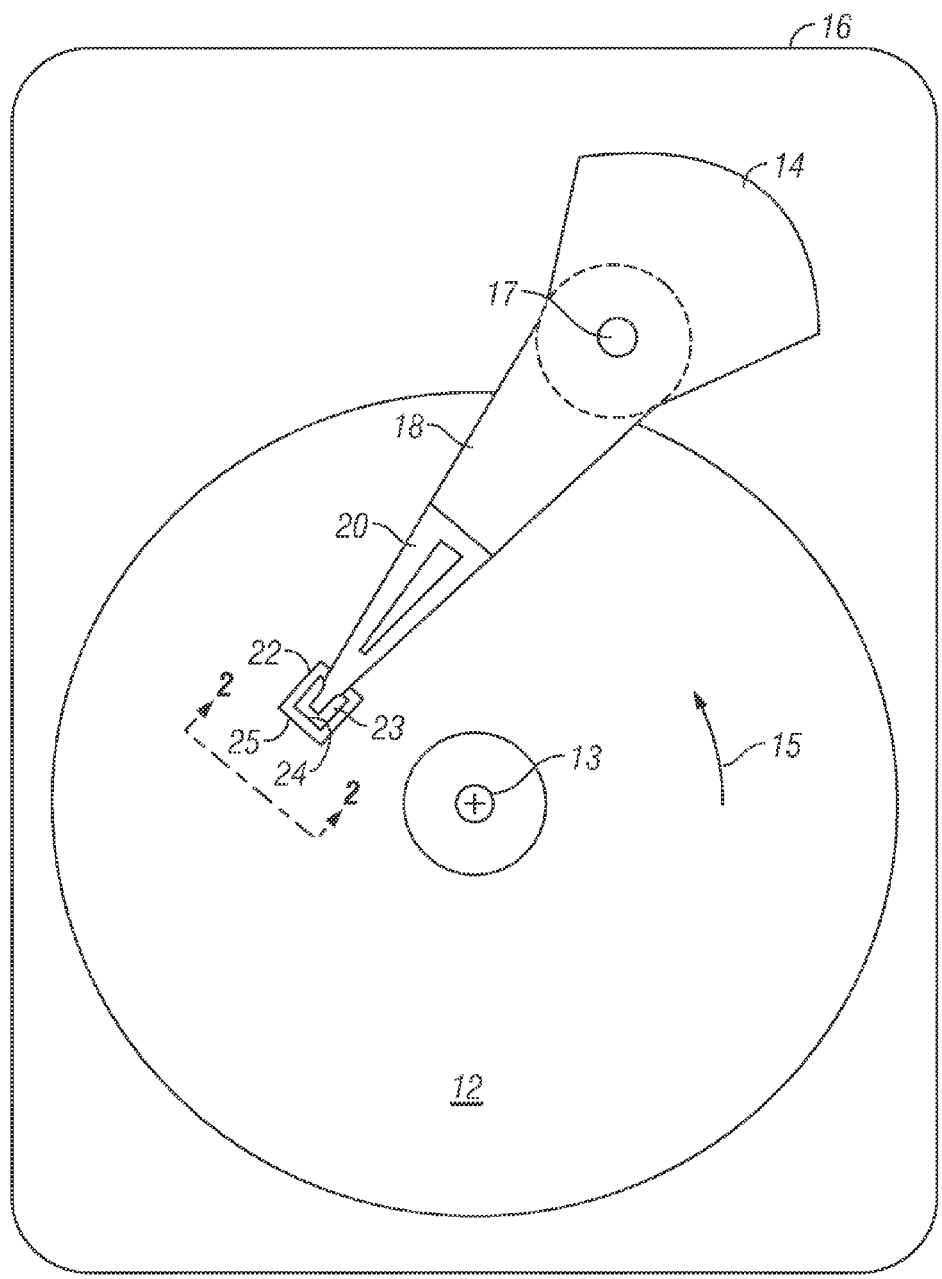
FIG. 1 is a schematic top view of a conventional magnetic recording hard disk drive with the cover removed.

The CPP magnetoresistive (MR) sensor of this invention has application for use in a magnetic recording disk drive, the operation of which will be briefly described with reference to FIGS. 1-3. FIG. 1 is a block diagram of a conventional magnetic recording hard disk drive. The disk drive includes a magnetic recording disk 12 and a rotary voice coil motor (VCM) actuator 14 supported on a disk drive housing or base 16. The disk 12 has a center of rotation 13 and is rotated in direction 15 by a spindle motor (not shown) mounted to base 16. The actuator 14 pivots about axis 17 and includes a rigid actuator arm 18. A generally flexible suspension 20 includes a flexure element 23 and is attached to the end of arm 18. A head carrier or air-bearing slider 22 is attached to the flexure 23. A magnetic recording read/write head 24 is formed on the trailing surface 25 of slider 22. The flexure 23 and suspension 20 enable the slider to "pitch" and "roll" on an air-bearing generated by the rotating disk 12. Typically, there are multiple disks stacked on a hub that is rotated by the spindle motor, with a separate slider and read/write head associated with each disk surface.

Figure 2:
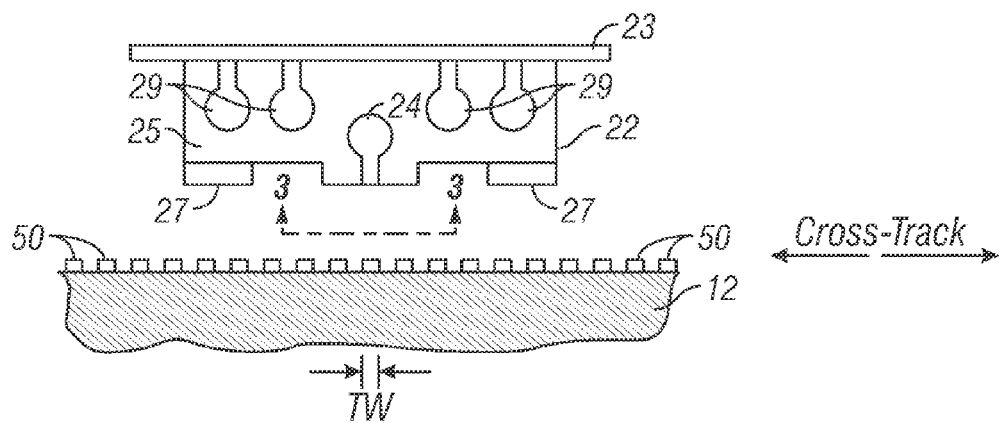
FIG. 2 is an enlarged end view of the slider and a section of the disk taken in the direction 2-2 in FIG. 1.

FIG. 2 is an enlarged end view of the slider 22 and a section of the disk 12 taken in the direction 2-2 in FIG. 1. The slider 22 is attached to flexure 23 and has an air-bearing surface (ABS) 27 facing the disk 12 and a trailing surface 25 generally perpendicular to the ABS. The ABS 27 causes the airflow from the rotating disk 12 to generate a bearing of air that supports the slider 20 in very close proximity to or near contact with the surface of disk 12. The read/write head 24 is formed on the trailing surface 25 and is connected to the disk drive read/write electronics by electrical connection to terminal pads 29 on the trailing surface 25. As shown in the sectional view of FIG. 2, the disk 12 is a patterned-media disk with discrete data tracks 50 spaced-apart in the cross-track direction, one of which is shown as being aligned with read/write head 24. The discrete data tracks 50 have a track width TW in the cross-track direction and may be formed of continuous magnetizable material in the circumferential direction, in which case the patterned-media disk 12 is referred to as a discrete-track-media (DTM) disk. Alternatively, the data tracks 50 may contain discrete data islands spaced-apart along the tracks, in which case the patterned-media disk 12 is referred to as a bit-patterned-media (BPM) disk. The disk 12 may also be a conventional continuous-media (CM) disk wherein the recording layer is not patterned, but is a continuous layer of recording material. In a CM disk the concentric data tracks with track width TW are created when the write head writes on the continuous recording layer.

Figure 3:
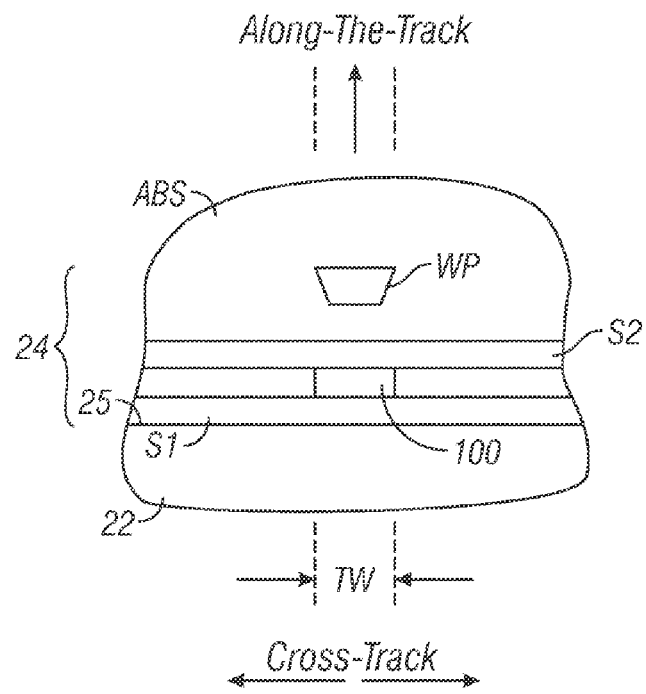
FIG. 3 is a view in the direction 3-3 of FIG. 2 and shows the ends of the read/write head as viewed from the disk.

FIG. 3 is a view in the direction 3-3 of FIG. 2 and shows the ends of read/write head 24 as viewed from the disk 12. The read/write head 24 is a series of thin films deposited and lithographically patterned on the trailing surface 25 of slider 22. The write head includes a perpendicular magnetic write pole (WP) and may also include trailing and/or side shields (not shown). The CPP MR sensor or read head 100 is located between two magnetic shields S1 and S2. The shields S1, S2 are formed of magnetically permeable material, typically a NiFe alloy, and may also be electrically conductive so they can function as the electrical leads to the read head 100. The shields function to shield the read head 100 from recorded data bits that are neighboring the data bit being read. Separate electrical leads may also be used, in which case the read head 100 is formed in contact with layers of electrically conducting lead material, such as ruthenium, tantalum, gold, or copper, that are in contact with the shields S1, S2. FIG. 3 is not to scale because of the difficulty in showing very small dimensions. Typically each shield S1, S2 is several microns thick in the along-the-track direction, as compared to the total thickness of the read head 100 in the along-the-track direction, which may be in the range of 20 to 40 nm.

Figure 4:
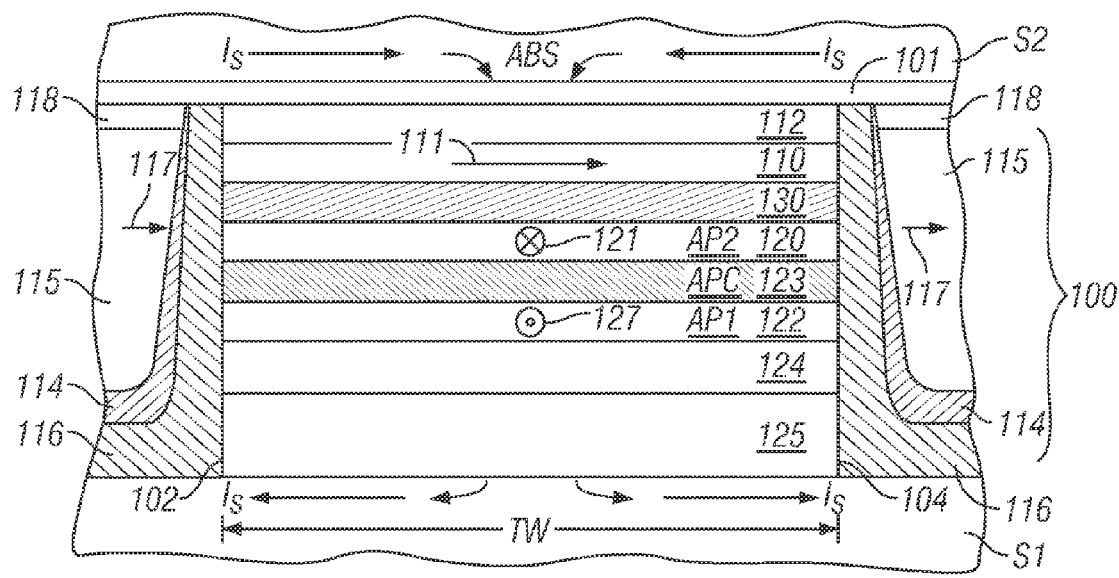
FIG. 4 is a cross-sectional schematic view of a CPP MR read head showing the stack of layers located between the magnetic shield layers.

FIG. 4 is view of the ABS showing the layers making up a CPP MR sensor structure as would be viewed from the disk. FIG. 4 will be used to describe the prior art sensor structure as well as the sensor structure according to this invention. Sensor 100 is a CPP MR read head comprising a stack of layers formed between the two magnetic shield layers S1, S2. The sensor 100 has a front edge at the ABS and spaced-apart side edges 102, 104 that define the track width (TW). The shields S1, S2 are formed of electrically conductive material and thus may also function as electrical leads for the sense current $I_S$, which is directed generally perpendicularly through the layers in the sensor stack. Alternatively, separate electrical lead layers may be formed between the shields S1, S2 and the sensor stack. The lower shield S1 is typically polished by chemical-mechanical polishing (CMP) to provide a smooth substrate for the growth of the sensor stack. A seed layer 101, such as a thin Ru/NiFe bilayer, is deposited, typically by sputtering, below S2 to facilitate the electroplating of the relatively thick S2.

The sensor 100 layers include a reference ferromagnetic layer 120 having a fixed magnetic moment or magnetization direction 121 oriented transversely (into the page), a free ferromagnetic layer 110 having a magnetic moment or magnetization direction 111 that can rotate in the plane of layer 110 in response to transverse external magnetic fields from the disk 12, and a nonmagnetic spacer layer 130 between the reference layer 120 and free layer 110. The CPP MR sensor 100 may be a CPP GMR sensor, in which case the nonmagnetic spacer layer 130 would be formed of an electrically conducting material, typically a metal like Cu, Au or Ag. Alternatively, the CPP MR sensor 100 may be a CPP tunneling MR (CPP-TMR) sensor, in which case the nonmagnetic spacer layer 130 would be a tunnel barrier formed of an electrically insulating material, like $TiO_2$, MgO or $Al_2O_3$.

The pinned ferromagnetic layer in a CPP MR sensor may be a single pinned layer or an antiparallel (AP) pinned structure like that shown in FIG. 4. An AP-pinned structure has first (AP1) and second (AP2) ferromagnetic layers separated by a nonmagnetic antiparallel coupling (APC) layer with the magnetization directions of the two AP-pinned ferromagnetic layers oriented substantially antiparallel. The AP2 layer, which is in contact with the nonmagnetic APC layer on one side and the sensor's nonmagnetic spacer layer on the other side, is typically referred to as the reference layer. The AP1 layer, which is typically in contact with an antiferromagnetic or hard magnet pinning layer on one side and the nonmagnetic APC layer on the other side, is typically referred to as the pinned layer. Instead of being in contact with a hard magnetic layer, AP1 by itself can be comprised of hard magnetic material so that AP1 is in contact with an underlayer on one side and the nonmagnetic APC layer on the other side. The AP-pinned structure minimizes the net magnetostatic coupling between the reference/pinned layers and the CPP MR free ferromagnetic layer. The AP-pinned structure, also called a "laminated" pinned layer, and sometimes called a synthetic antiferromagnet (SAF), is described in U.S. Pat. No. 5,465,185.

The pinned layer in the CPP GMR sensor in FIG. 4 is a well-known AP-pinned structure with reference ferromagnetic layer 120 (AP2) and a lower ferromagnetic layer 122 (AP1) that are antiferromagnetically coupled across an AP coupling (APC) layer 123. The APC layer 123 is typically Ru, Ir, Rh, Cr or alloys thereof. The AP1 and AP2 layers, as well as the free ferromagnetic layer 110, are typically formed of crystalline CoFe or NiFe alloys, amorphous or crystalline CoFeB alloys, or a multilayer of these materials, such as a CoFe/NiFe bilayer. The AP1 and AP2 ferromagnetic layers have their respective magnetization directions 127, 121 oriented antiparallel. The AP1 layer 122 may have its magnetization direction pinned by being exchange-coupled to an antiferromagnetic (AF) layer 124 as shown in FIG. 4. The AF layer 124 is typically a Mn alloy, e.g., PtMn, NiMn, FeMn, IrMn, PdMn, PtPdMn or RhMn. Alternatively, the AP-pinned structure may be "self-pinned" or it may be pinned by a hard magnetic layer such as $Co_{100-x}Pt_x$ or $Co_{100-x-y}Pt_xCr_y$ (where x is about between 8 and 30 atomic percent). Instead of being in contact with a hard magnetic layer, AP1 layer 122 by itself can be comprised of hard magnetic material so that it is in contact with an underlayer on one side and the nonmagnetic APC layer 123 on the other side. In a "self pinned" sensor the AP1 and AP2 layer magnetization directions 127, 121 are typically set generally perpendicular to the disk surface by magnetostriction and the residual stress that exists within the fabricated sensor. It is desirable that the AP1 and AP2 layers have similar moments. This assures that the net magnetic moment of the AP-pinned structure is small so that magnetostatic coupling to the free layer 110 is minimized and the effective pinning field of the AF layer 124, which is approximately inversely proportional to the net magnetization of the AP-pinned structure, remains high. In the case of a hard magnet pinning layer, the hard magnet pinning layer moment needs to be accounted for when balancing the moments of AP1 and AP2 to minimize magnetostatic coupling to the free layer.

A seed layer 125 may be located between the lower shield layer S1 and the AP-pinned structure. If AF layer 124 is used, the seed layer 125 enhances the growth of the AF layer 124. The seed layer 125 is typically one or more layers of NiFeCr, NiFe, Ta, Cu or Ru. A capping layer 112 is located between the free ferromagnetic layer 110 and the upper shield layer S2. The capping layer 112 provides corrosion protection and may be a single layer or multiple layers of different materials, such as Ru, Ta, Ti, or a Ru/Ta/Ru, Ru/Ti/Ru, or Cu/Ru/Ta trilayer.

In the presence of an external magnetic field in the range of interest, i.e., magnetic fields from recorded data on the disk, the magnetization direction 111 of free layer 110 will rotate while the magnetization direction 121 of reference layer 120 will remain fixed and not rotate. Thus when a sense current $I_S$ is applied from top shield S2 perpendicularly through the sensor stack to bottom shield S1 (or from S1 to S2), the magnetic fields from the recorded data on the disk will cause rotation of the free-layer magnetization 111 relative to the reference-layer magnetization 121, which is detectable as a change in electrical resistance.

A ferromagnetic biasing layer 115, typically a CoPt or CoPtCr hard (i.e., high crystalline anisotropy and thus high coercivity, $H_c$, due to hcp or hct uniaxial crystal structure) magnetic layer and thus also called a "hard bias" layer, is also formed outside of the sensor stack near the side edges 102, 104 of the sensor 100, particularly near the side edges of free layer 110. The biasing layer 115 is electrically insulated from side edges 102, 104 of sensor 100 by a thin electrically insulating layer 116, which is typically alumina ($Al_2O_3$) but may also be a silicon nitride ($SiN_x$) or another metal oxide like a Ta oxide, a Ti oxide or a Mg oxide. A seed layer 114 is typically deposited on the insulating layer 116 to facilitate the growth of the biasing layer 115 with its magnetic anisotropy c-axis lying in the plane of the layer. A capping layer 118, such as layer of Cr, or a multilayer of Ta/Cr is deposited on top of the biasing layer 115. The upper layer of capping layer 118, for example Cr, also serves the purpose as a chemical-mechanical-polishing (CMP) stop layer during fabrication of the sensor. The biasing layer 115 has a magnetization 117 generally parallel to the ABS and thus longitudinally biases the magnetization 111 of the free layer 110. Thus in the absence of an external magnetic field the magnetization 117 of biasing layer 115 is parallel to the magnetization 111 of the free layer 110.

Figure 5:
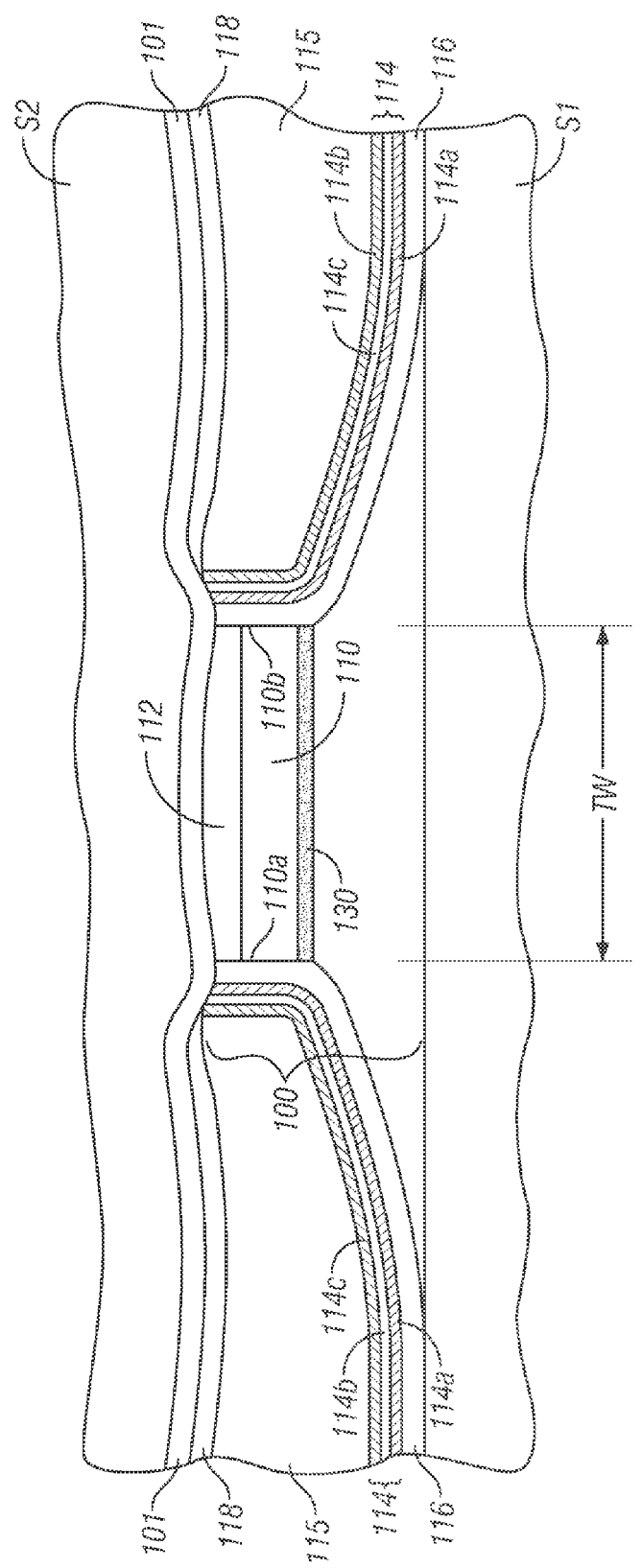
FIG. 5 is a line drawing based on a Scanning Transmission Electron Microscope (STEM) image of an actual sensor, and illustrates the trilayer seed structure for the hard bias layer according to this invention.

This invention is a CPP MR sensor like that described and shown in FIG. 4, but wherein the seed layer 114 is a trilayer seed structure consisting of a layer of tantalum (Ta) on and in contact with insulating layer 116, a layer of titanium (Ti) or a Ti-oxide on and in contact with the Ta layer, and a layer of tungsten (W) on and in contact with the Ti or Ti-oxide layer. FIG. 5 is a line drawing based on a Scanning Transmission Electron Microscope (STEM) image of an actual sensor, and illustrates the trilayer seed structure 114 below the hard bias layer 115 according to this invention. The insulating layer 116 is preferably alumina and is deposited on S1 and on the TW edges 110a, 110b of free layer 110. However, the insulating layer may also be formed of a silicon nitride or another metal oxide like a Ta-oxide, a Ti-oxide or a Mg-oxide. It may be preferable for insulating layer 116 to be thinner close to the TW edges of the free layer to get the hard bias layer 115 closer for higher effective field, but thicker away from the free layer on S1 to obtain good insulating properties and avoid electrical shunting. A typical thickness of insulating layer 116 is about 20 to 40 Å close to the TW edges of the free layer and about 30 to 50 Å away from the free layer on S1. The trilayer structure 114 consists of three layers 114a, 114b and 114c, each deposited by ion beam deposition (IBD). The first layer 114a consists essentially of Ta and is deposited directly on the upper surface of insulating layer 116 to cover the insulating layer 116 in the region over S1 and may extend into the region adjacent the free layer edges 110a, 110b. The second layer 114b is preferably a Ti-oxide or a composition that includes Ti and a Ti-oxide and is deposited directly on the Ta layer 114a. Alternatively, layer 114b may be an oxide-free layer consisting essentially of Ti. The third layer 114c consists essentially of W and is deposited directly on second layer 114b. The hard bias layer 115 is preferably formed of a ferromagnetic CoPt alloy with high coercivity ($H_c$ greater than 1800 Oe). The thickness of hard bias layer 115 is in the range of about 100 to 200 Å. A capping layer 118 like Cr or Ta is deposited on top of bias layer 115.

As the data density increases in magnetic recording disk drives, there is a requirement for a decrease in the read head dimensions, particularly the shield-to-shield (S1-to-S2) spacing. However, even as S1-to-S2 spacing is reduced it is desirable to maximize the remanence-thickness product ($M_r$t) of hard bias layer 115 to assure magnetic stabilization of the free layer 110. This means that it is desirable to have seed layer structure 114 as thin as possible while still permitting growth of the CoPt hard bias layer 115 with adequate magnetic properties, such as $H_c$, $M_r$t and squareness ($S=M_r/M_s$). Also it is desirable to have seed layer structure 114 as thin as possible because that increases free layer stabilization due to increased magnetostatic coupling. In this invention, the thickness of the seed layer 114 can be less than 40 Å, which is approximately the minimum thickness of prior art seed layers, and as thin as 29 Å. Yet even with this thinner seed layer structure the hard bias layer has magnetic properties better than in the prior art.

A number of test coupons with CoPt hard bias layers and Ta/Ti/W trilayer seed layer structures were fabricated with various thicknesses of the individual layers, and compared with CoPt hard bias layers with various other seed layer structures. Each of the individual seed layers was deposited by IBD. It was found that excellent CoPt magnetic properties can be achieved with a minimum W thickness of 13 Å and a total minimum thickness of 29 Å for the Ta/Ti/W trilayer seed layer structures. Magnetic properties were not significantly improved for W thicknesses greater than 13 Å. Surprisingly, there was a precipitous drop in magnetic properties when the W thickness was less than 12 Å. The Ta/Ti/W trilayer test structures (thicknesses between 29 Å and 35 Å) exhibited $H_c$ between 2200-2400 Oe, $S \geq 0.80$ and $M_r t \geq 1.3$ memu/cm$^2$. By comparison, 20 ÅTa/20 ÅW bilayer (about 40-42 Å total thickness) test structures exhibited similar magnetic properties, but with a much greater total thickness of the seed layer. Other test structures with 45 Å NiTa/CrMo bilayers as the seed layer structure with the upper CrMo layer in contact with the CoPt hard bias layer exhibited $H_c$ between 1750-1850 Oe, $S \leq 0.80$ and $M_r t \leq 1.3$ memu/cm$^2$, all of which are less than the values for the significantly thinner Ta/Ti/W seed layer. The preferred thickness ranges for the Ta/Ti/W trilayer are as follows:

(xÅ)Ta/(yÅ)Ti/(at least 13 Å)W, where x and y each is at least 6 Å and x+y is at least 16 Å.

Thus the Ta/Ti/W trilayer seed layer structure allows a reduction in total seed layer thickness of about 11 Å from the prior art thickness of about 40 Å with similar or better magnetic properties of the CoPt hard bias layer and brings the hard bias layer about 25% closer to the free layer so as to significantly improve the free layer stabilization.

Test coupons similar to those with the above-described Ta/Ti/W trilayer seed layer structures were fabricated, but wherein after the Ti layer was deposited by IBD it was exposed to an Ar/O$_2$ (20% O$_2$) gas. Detailed analysis of the Ti layer after the gaseous exposure was not performed but it is believed that the layer is predominantly a Ti-oxide or partially oxidized Ti (i.e., a composition of a Ti-oxide with unoxidized Ti). Similar magnetic properties were achieved as for the Ta/Ti/W trilayer seed layer structures, but the squareness S was improved to 0.83 and $M_r t$ was improved up to 1.39 memu/cm$^2$. Thus the seed layer structure of this invention also encompasses a trilayer seed layer structure wherein the second layer may include Ti-oxide in addition to or instead of pure Ti. Thus the second layer consists of a material selected from one or both of Ti and a Ti-oxide.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetoresistive sensor structure for sensing magnetically recorded data from a magnetic recording medium, the structure comprising:
   a substrate;
   a first shield layer formed of magnetically permeable material on the substrate;
   a magnetoresistive sensor comprising a stack of layers including a ferromagnetic free layer on the first shield layer and having a front edge for facing a magnetic recording medium, a back edge recessed from the front edge, and two spaced-apart side edges that define a sensor track width (TW), the sensor being capable of sensing magnetically recorded data when a sense current is applied perpendicular to the planes of the layers in the sensor stack;
   an electrically insulating layer on and in contact with the side edges of the free layer and on regions of the first shield layer adjacent the sensor;
   a seed layer structure consisting of a layer of Ta on and in contact with said insulating layer, a layer selected from one or both of Ti and a Ti-oxide on and in contact with the Ta layer, and a layer of W on and in contact with the Ti-containing layer; and
   a ferromagnetic biasing layer comprising an alloy comprising Co and Pt on and in contact with the W layer of said seed layer structure.

2. The sensor structure of claim 1 wherein said seed layer structure has a thickness equal to or greater than 29 Å and less than 40 Å Angstroms.

3. The sensor structure of claim 2 wherein the W layer has a thickness equal to or greater than 13 Å.

4. The sensor structure of claim 1 wherein the biasing layer has a coercivity $H_c$ greater than 1850 Oe.

5. The sensor structure of claim 4 wherein the biasing layer has a coercivity $H_c$ greater than 2200 Oe.

6. The sensor structure of claim 1 wherein the biasing layer has a ratio (S) of remanent magnetization ($M_r$) to saturation magnetization ($M_s$) greater than 0.80.

7. The sensor structure of claim 1 wherein the biasing layer has a remanent magnetization-thickness product ($M_r t$) greater than 1.3 memu/cm$^2$.

8. The sensor structure of claim 1 wherein the insulating layer is formed of a material selected from an aluminum oxide, a tantalum oxide, a magnesium oxide and a silicon nitride.

9. The sensor structure of claim 1 further comprising a capping layer on the ferromagnetic biasing layer.

10. The sensor structure of claim 1 wherein the sensor is a giant magnetoresistance (GMR) sensor.

11. The sensor structure of claim 1 wherein the sensor is a tunneling magnetoresistance (TMR) sensor.

12. A current-perpendicular-to-the-plane (CPP) magnetoresistive (MR) read head for a magnetic recording disk drive comprising:
   a substrate;
   a first shield layer of magnetically permeable material on the substrate;
   a sensor stack of layers including a ferromagnetic free layer on the first shield layer and having two spaced-apart side edges, the free layer having a magnetization free to rotate in the presence of magnetic fields from recorded data on the disk;
   an electrically insulating layer on and in contact with the side edges of the free layer and on regions of the first shield layer adjacent the sensor stack;
   a trilayer seed layer structure having a thickness less than 40 Å and consisting of a first seed layer of Ta on and in contact with said insulating layer, a second seed layer selected from one or both of Ti and a Ti-oxide on and in contact with the Ta layer, and a third seed layer of W having a thickness equal to or greater than 13 Å on and in contact with the second seed layer;
   a ferromagnetic hard bias layer comprising an alloy comprising Co and Pt having a coercivity greater than 1850 Oe on and in contact with the third seed layer for biasing the magnetization of the free layer;
   a capping layer on the hard bias layer; and
   a second shield layer of magnetically permeable material on the sensor stack and capping layer.

13. The read head of claim 12 wherein the second seed layer consists essentially of a Ti-oxide.

14. The read head of claim 12 wherein the hard bias layer has a coercivity greater than 2200 Oe.

15. The read head of claim 12 wherein the hard bias layer has a ratio (S) of remanent magnetization ($M_r$) to saturation magnetization ($M_s$) greater than 0.80.

16. The read head of claim 12 wherein the hard bias layer has a remanent magnetization-thickness product ($M_r t$) greater than 1.3 memu/cm$^2$.

17. The read head of claim 12 wherein the insulating layer is formed of a material selected from an aluminum oxide, a tantalum oxide, a magnesium oxide and a silicon nitride.

18. The read head of claim 12 wherein the CPP MR read head is a giant magnetoresistance (GMR) read head.

19. The read head of claim 12 wherein the CPP MR read head is a tunneling magnetoresistance (TMR) read head.

* * * * *